(12) United States Patent
Raab et al.

(10) Patent No.: US 11,466,740 B2
(45) Date of Patent: Oct. 11, 2022

(54) BRAKE DISC ASSEMBLY FOR A DISC BRAKE OF A MOTOR VEHICLE, AND METHOD

(71) Applicant: Robert Bosch GmbH, Stuttgart (DE)

(72) Inventors: Roland Raab, Wiesloch (DE); Laurent Le Barzic, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 16/607,988

(22) PCT Filed: Apr. 19, 2018

(86) PCT No.: PCT/EP2018/059978
§ 371 (c)(1),
(2) Date: Sep. 28, 2020

(87) PCT Pub. No.: WO2018/197319
PCT Pub. Date: Nov. 1, 2018

(65) Prior Publication Data
US 2021/0010550 A1   Jan. 14, 2021

(30) Foreign Application Priority Data

Apr. 27, 2017 (DE) .................... 10 2017 207 114.1
Jun. 22, 2017 (DE) ..................... 10 2017 210 451.1

(51) Int. Cl.
*F16D 65/12*   (2006.01)
*F16D 65/02*   (2006.01)

(52) U.S. Cl.
CPC .... *F16D 65/123* (2013.01); *F16D 2065/1316* (2013.01); *F16D 2065/1328* (2013.01); *F16D 2065/1392* (2013.01)

(58) Field of Classification Search
CPC ........................ F16D 65/12; F16D 65/123–128
(Continued)

(56) References Cited

U.S. PATENT DOCUMENTS 9,695,895 B2 *   7/2017   Tironi ................... F16D 65/123
11,242,902 B2 *  2/2022   Bozovic ............... F16D 65/125
(Continued)

FOREIGN PATENT DOCUMENTS

DE    100 32 972 B4    4/2004
EP    1375953 A2 *    1/2004 ........... F16D 65/123
(Continued)

OTHER PUBLICATIONS

International Search Report corresponding to PCT Application No. PCT/EP2018/059978, dated Aug. 3, 2018 (German and English language document) (6 pages).

*Primary Examiner* — Christopher P Schwartz
(74) *Attorney, Agent, or Firm* — Maginot, Moore & Beck LLP (57) ABSTRACT

A brake disc assembly includes a friction ring made of a first material and a brake disc chamber made of a second material and which is secured to the friction ring. The brake disc chamber has a first connection ring with multiple first radial openings, and the friction ring has a second connection ring with multiple second radial openings. The connection rings are coaxial such that at least some of the first and second radial openings are flush with one another. A fixing pin lies in at least some of the flush radial openings to connect the connection rings. The first connection ring has at least one wall element with at least one additional radial opening paired with the circumference of the first connection ring such that the additional radial opening is flush with one of the first radial openings. The fixing pin also lies in the additional radial opening.

12 Claims, 4 Drawing Sheets

(58) Field of Classification Search
USPC ................ 188/18 A, 218 A, 218 XL, 264 A,
188/264 AA
See application file for complete search history.

(56) References Cited

U.S. PATENT DOCUMENTS

| | | | | |
|---|---|---|---|---|
| 2008/0164109 A1* | 7/2008 | Guether | ................ | F16D 65/12 |
| | | | | 188/218 XL |
| 2013/0146405 A1* | 6/2013 | Kim | ................ | C22C 38/22 |
| | | | | 188/218 XL |
| 2019/0203784 A1* | 7/2019 | Giese | ................ | F16D 55/22 |

FOREIGN PATENT DOCUMENTS

| | | |
|---|---|---|
| FR | 2 797 929 A1 | 3/2001 |
| WO | 02/33280 A1 | 4/2002 |
| WO | 03/029684 A1 | 4/2003 |
| WO | WO-2004085870 A1 * 10/2004 | ............. F16D 65/12 |

* cited by examiner

BRAKE DISC ASSEMBLY FOR A DISC BRAKE OF A MOTOR VEHICLE, AND METHOD

This application is a 35 U.S.C. § 371 National Stage Application of PCT/EP2018/059978, filed on Apr. 19, 2018, which claims the benefit of priority to Serial No. DE 10 2017 207 114.1, filed on Apr. 27, 2017 in Germany, and which claims the benefit of priority to Serial No. DE 10 2017 210 451.1, filed on Jun. 22, 2017 in Germany, the disclosures of which are incorporated herein by reference in their entirety.

The disclosure relates to a brake disk assembly for a disk brake of a motor vehicle, having a friction ring which is made from a first material, and having a brake disk chamber which is made from a second material and is fastened to the friction ring at the end side, to which end the brake disk chamber has a first connector ring having a plurality of first radial openings, and the friction ring has a second connector ring having a plurality of second radial openings, wherein the connector rings are disposed so as to be mutually coaxial in such a manner that at least some of the first and the second radial openings are mutually aligned, and wherein a fixing pin for the form-fitting mutual connection of the connector rings lies in at least some of the mutually aligned radial openings.

BACKGROUND

Brake disk assemblies of the type mentioned at the outset are known from the prior art. Patent document DE 100 32 972 B4 thus relates to a brake disk assembly which has a friction ring having a first connector ring, and a brake disk chamber having a second connector ring. The first connector ring herein has a plurality of first radial openings, and the second connector ring has a plurality of second radial openings, wherein the first and the second radial openings are mutually aligned. The friction ring and the brake disk chamber are connected to one another in a form-fitting manner by rivets which are incorporated in the mutually aligned radial openings. A similar brake disk assembly which is secured by fixing pins is derived from the first and unexamined publication FR 27 97 929 A1.

SUMMARY

It is provided according to the disclosure that the first connector ring has at least one wall element which has at least one further radial opening and is assigned to the connector ring on the circumference in such a manner that the further radial opening is aligned with one of the first radial openings, and that the fixing pin lies also in the further radial opening. The advantage herein lies in that a further or additional contact point for transmitting force between the fixing pin and the brake disk chamber is implemented on account of the wall element such that an increase in terms of the torque that can be transmitted between the friction ring and the brake disk chamber is achieved. The overall contact face which is available for transmitting force herein is in each case the contact face between the shell wall of the fixing pin and the internal side of the first radial opening of the first connector ring and the internal side of the further radial opening of the wall element. The mechanical force, or stress, acting by the fixing pin on the brake disk chamber is reduced on account of the increased overall contact face, because the acting force is thus distributed across a larger area or contact face. This minimizes the risk of damage to the brake disk chamber by virtue of high mechanical stresses, and thus guarantees a high stability of the connection between the friction ring and the brake disk chamber. The brake disk chamber is preferably made from metal sheet, for example steel sheet.

The first, the second and/or a further radial opening are preferably configured as a radial bore. This has the advantage that the respective radial opening can be produced in a simple manner, for example by way of a boring process, on the one hand. On the other, this results in the advantage that, when placing the fixing pin into the first, the second and/or a further radial opening that are/is configured as a radial bore, the friction ring, the brake disk chamber and/or the wall element are/is particularly effectively secured in relation to an axial displacement, in particular in relation to a displacement in both axial directions.

It is particularly preferably provided that the first, the second and/or a further radial opening are configured as an axial peripheral opening that is open toward the periphery. Here too, this results in the advantage that the respective radial opening can be produced in a simple manner, for example by a punching process. Moreover, the advantage of a simple assembly or assembly capability of the brake disk assembly by axially pushed-fitting in particular the brake disk chamber and/or the wall element onto the friction ring, in particular the fixing pin or fixing pins that are placed into the friction ring, results. It is preferably provided that at least one of the first, the second and/or further radial openings, for example only the second radial opening is configured as a radial bore, and at least one of the first, the second and/or further radial openings, for example only the first and the further radial opening, are configured as a peripheral opening.

According to one preferred refinement of the disclosure it is provided that the at least one wall element is assigned to the first connector ring on the internal circumference on the external circumference. This advantageously guarantees that the wall element on the circumference in an arbitrary manner is capable of being disposed on the connector ring or assigned to the connector ring. For example, when an external diameter of the first connector ring corresponds to an internal diameter of the second connector ring, it is preferably provided that the wall element is assigned to the first connector ring on the internal circumference. When the external diameter of the first connector ring is smaller than the internal diameter of the second connector ring, for example, it is preferably provided that the wall element is assigned to the first connector ring on the external circumference. It is thus possible, for example, for the external diameter of the first connector ring by means of the wall element to be adapted to the internal diameter of the second connector ring such that the first connector ring and the second connector ring are capable of being connected, in particular press-fitted, to one another in particular without radial play.

The wall element is preferably a separate ring element which is disposed so as to be coaxial with the first connector ring. The advantage herein lies in that the wall element is a separate component which is connected to the first connector ring in a simple manner, in particular by means of the fixing pin. The connector ring preferably has a diameter which at least substantially corresponds to the internal diameter or the external diameter of the first connector ring. The ring element is preferably formed from a metallic material.

It is preferably provided that the ring element is press-fitted into or onto the first connector ring. The advantage herein lies in that the ring element is connected to the first connector ring in a stable, in particular captive, and simple manner. Moreover, the press-fitting of the ring element into or onto the first connector ring guarantees a stable mutual alignment of the first and the further radial opening. Additional fastening means, or fixing the ring element to the first connector ring by means of the fixing pin, are thus not required in order for the mutual alignment to be stabilized.

It is preferably provided that the first connector ring and the at least one wall element are connected to one another by at least one tubular rivet which penetrates the first radial opening and the further radial opening.

The advantage herein lies in that the tubular rivet prevents the wall element being released from the first connector ring in a particularly effective manner. Moreover, the tubular rivet prevents a rotation of the wall element relative to the first connector ring. The tubular rivet preferably has an internal diameter which at least substantially corresponds to an external diameter of the fixing pin such that the fixing pin in order to be pushed into the radial opening of the friction ring, is guidable through the tubular rivet in particular without play. The tubular rivet thus lies in the first or the further radial opening, or in the tubular rivet lying in the first or the further radial opening, respectively, such that the transmission of force is not performed from the fixing pin directly to the brake disk chamber, but by way of the intervening tubular rivet. The tubular rivet furthermore preferably has an external diameter which corresponds to an internal diameter of the first and the further radial opening. The tubular rivet is preferably made from a metallic material. Alternatively, it is provided that the first connector ring and the at least one wall element are connected to one another by at least one solid rivet which penetrates the first and the further radial opening, wherein the solid rivet is preferably subsequently bored in a penetrating manner by a boring procedure such that tubular rivet is configured herein. Independently of whether the tubular rivet is generated by boring or is already present as a tubular rivet, it is preferably provided that the assigned second radial opening of the friction ring is produced or post-machined through the tubular rivet/solid rivet such that a mutual alignment between the first and the further radial opening and the second radial opening of the friction ring is positively guaranteed. Accordingly, it is likewise preferably provided that in an embodiment without a tubular rivet or a solid rivet the respective second radial opening of the friction ring is generated by a boring procedure through the first and the further radial opening, or by a boring procedure in which the first and the further radial opening are also produced. It is achieved on account of a corresponding selection of the bore diameter that positive press-fitting of the fixing pin into the friction ring is enabled. According to one preferred embodiment the diameter of the second radial opening is chosen so as to be smaller than the diameter of the first and the further radial opening, and optionally is also smaller than the internal diameter of the optional tubular rivet such that the fixing pin is indeed press-fitted into the friction ring but not into the tubular rivet or the first and the further radial opening, so as to avoid any redundancy and to guarantee a reliable operation.

The wall element is preferably configured so as to be integral to the first connector ring. The advantage herein lies in that the wall element is implemented by the brake disk chamber per se. Wall elements that are to be separately produced and be disposed on the first connector ring are thus not required. The configuration of the wall element so as to be integral to the first connector ring thus enables a particularly cost-effective and material-saving production of the brake disk chamber.

It is preferably provided that the wall element is configured as a bent-back wall tongue. The advantage herein lies in that the wall element is configured on the brake disk chamber in a simple manner. The wall tongue is thus formed by bending in particular once material of the brake disk chamber, in particular material in the region of the first connector ring. The wall tongue preferably has a predefinable spacing from a shell wall or from the first connector ring of the brake disk chamber. Alternatively or additionally, the wall tongue is configured by bending the material multiple times. The bent-back wall tongue is capable of being assigned to the first connector ring on the internal circumference or the external circumference.

It is particularly preferably provided that the first connector ring has a plurality of wall elements or wall tongues which are disposed, in particular uniformly, across the circumference. The advantage herein lies in that the brake disk chamber is capable of being connected to the friction ring in a form-fitting manner at a plurality of locations along the circumference of said brake disk chamber. This guarantees in particular an increased stability in relation to an axial and/or radial displacement of the brake disk chamber relative to the friction ring.

According to one preferred refinement of the disclosure it is provided that the respecting fixing pin is press-fitted into at least one radial opening of the mutually aligned first, second and further radial openings. The advantage herein lies in that the fixing pin is connected in a particularly stable manner, in particular without play, to at least one of the radial openings. The fixing pin is preferably press-fitted into at least the second radial opening, thus the radial opening of the friction ring. It is preferably provided herein that the friction ring at least in a region of the second radial opening, and/or the fixing pins has at least one equalization opening which is configured so that air can escape to the environment when press-fitting. The equalization opening thus advantageously prevents any creation of an air cushion when the fixing pin is press-fitted into the friction ring. Alternatively, the fixing pin is press-fitted into the first, the second, and the further radial opening. This guarantees a particularly effective and stable connection between the friction ring and the brake disk chamber.

The method for producing a brake disk assembly for a disk brake of a motor vehicle is distinguished in that a friction ring is made from a first material and a brake disk chamber is made from a second material. The brake disk chamber thereafter is fastened to the friction ring at the end side. To this end, a first connector ring which has a plurality of first radial openings is configured on the brake disk chamber, and a second connector ring which has a plurality of second radial openings is configured on the friction ring. The connector rings herein are disposed so as to be mutually coaxial in such a manner that at least some of the first and the second radial openings are mutually aligned. A fixing pin for the form-fitting mutual connection of the connector rings is placed into at least some of the mutually aligned radial openings. Furthermore, at least one wall element which has at least one further radial opening is configured in the first connector ring, wherein the wall element is assigned to the connector ring on the circumference in such a manner that the further radial opening is aligned with one of the first radial openings, wherein the fixing pin is placed also into the further radial opening. The advantages already mentioned are derived on account thereof. Further advantages and preferred features are derived herein.

BRIEF DESCRIPTION OF THE DRAWINGS

The disclosure is to be explained in more detail hereunder by means of the drawings in which.

DETAILED DESCRIPTION

Figure 1:
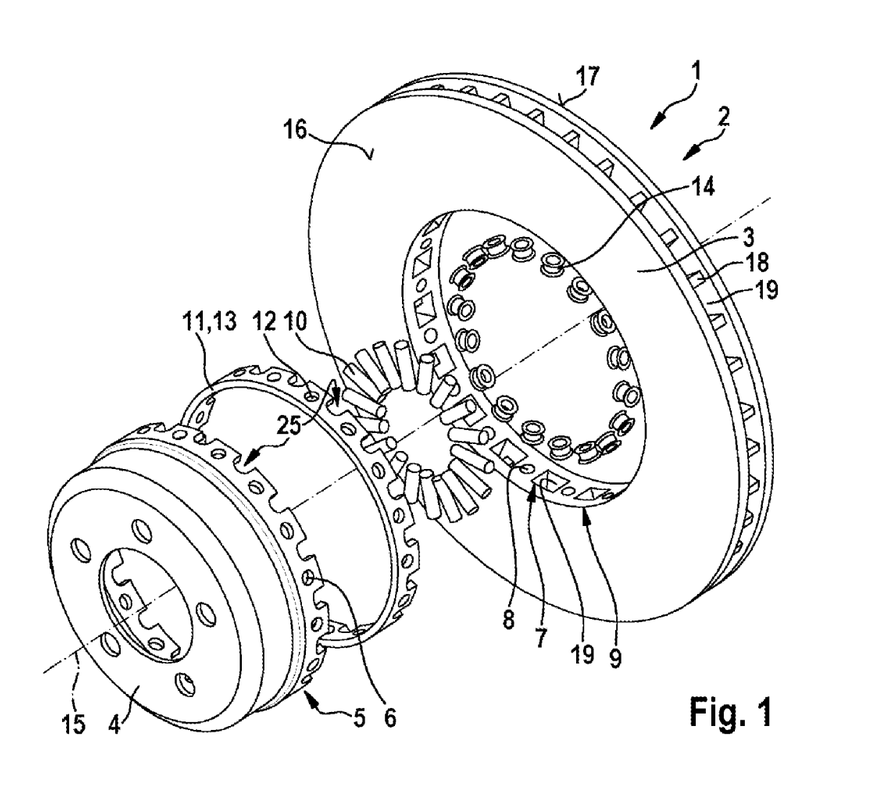
FIG. 1 shows a brake disk assembly according to a first exemplary embodiment in an exploded illustration.

FIG. 1 shows an exploded illustration of an advantageous brake disk assembly 1 for a disk brake 2 of a motor vehicle (not illustrated here), having a friction ring 3 made from a first material, in particular a casting material, for example iron, and having a brake disk chamber 4 made from a second material, for example a steel sheet, aluminum, or an aluminum alloy. The brake disk chamber 4 is capable of being fastened/is fastened to the friction ring 3 at the end side. The brake disk chamber 4 for the end-side fastening has a first connector ring 5 having a plurality of first radial openings 6, in each case configured as a radial bore, and the friction ring 3 has a second connector ring 7 having a plurality of second radial openings 8, in each case configured as a radial bore. The second connector ring 7 is presently formed by an internal circumferential face 9 of the friction ring 3. Alternatively, the second connector ring 7 is formed by an axially projecting assembly ring which is preferably molded to the internal circumferential face 9. The connector rings 5, 7 are disposed so as to be mutually coaxial in such a manner that the first radial openings 6 and the second radial openings 8 are mutually aligned. Furthermore provided are fixing pins 10 which for the form-fitting connection between the first connector ring 7 and the second connector ring 5 lie in the mutually aligned radial openings 6, 8, or are capable of being placed in said radial openings 6, 8. The fixing pins 10 are formed from a material having a high mechanical strength.

The first connector ring 5 has at least one wall element 11 having a plurality of further radial openings 12, in each case configured as a radial bore. The wall element 11 is presently an in particular prefabricated ring element 13 that is disposed so as to be coaxial with the first connector ring 5. The wall element 11 is assigned to the first connector ring 5 on the circumference in such a manner that one of the further radial openings 12 is in each case aligned with one of the first radial openings 6 and one of the second radial openings 8. It is provided herein that the fixing pin 10 lies also in the further radial opening 12. Furthermore provided is at least one tubular rivet 14 which penetrates the first radial opening 6 and the further radial opening 12 and connects the first connector ring 5 and the at least one wall element 11 or the ring element 13 to one another.

The friction ring 3 furthermore has friction ring disks 16, 17 which are disposed so as to be mutually spaced apart in the direction of a rotation axis 15 and which are in particular integrally connected to one another by webs 18 which are disposed between the friction ring disks 16, 17 and extend in the radial direction, thus perpendicularly to the rotation axis 15. One ventilation duct 19 is in each case configured between two neighboring webs 18 herein.

The further radial opening 12 and the first and the second radial opening 6, 8 preferably have in each case an identical diameter such that the fixing pin 10 can be placed in an optimal manner into all three radial openings 6, 8, 12.

In each case one clearance 25 that in the axial direction is open toward the periphery is preferably configured in the first connector ring 5 between in each case two first radial openings 6 and/or in the wall element 11, or the ring element 13, respectively, between in each case two further radial openings 12, said clearance 25 in a state in which the friction ring 3 and the brake disk chamber 4 are connected to one another in a form-fitting manner enabling air to flow through the ventilation ducts 19.

Figure 2:
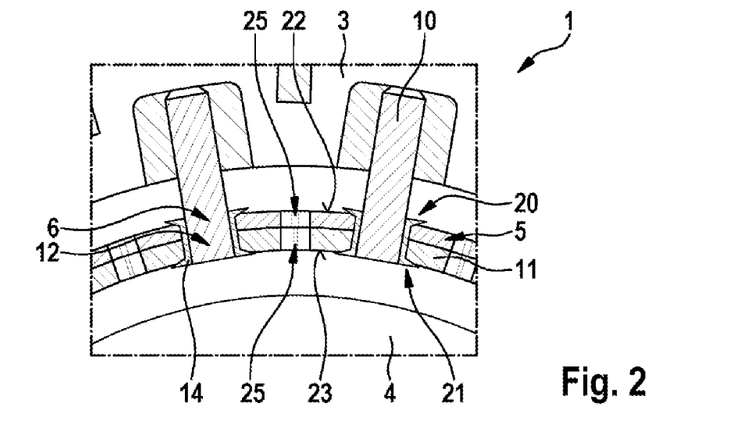
FIG. 2 shows the brake disk assembly of FIG. 1 in a detailed illustration.

FIG. 2 shows the friction ring 3 and the brake disk chamber 4 in a state connected in a form-fitting manner by way of the fixing pins 10. The wall element 11 is presently assigned to the first connector ring 5 on the internal circumference. Alternatively or additionally, it is provided that further wall elements 11 are assigned to, or are capable of being assigned to, the first connector ring 5 on the internal circumference and/or the external circumference. In order to guarantee a stable connection of the wall element 11 and the first connector ring 5, the wall element 11 or the ring element 13 is preferably press-fitted into the first connector ring 5. The tubular rivet 14 connecting the first connector ring 5 and the wall element 11, on both ends or end portions, thus a radially inward and a radially outward end portion, of said tubular rivet 14, has in each case one collar 20, 21. Presently, the one collar 20 bears on an external circumferential shell wall 22 of the first connector ring 5, and the other collar 21 bears on an internal circumferential shell wall 23 of the ring element 13. This guarantees a particularly stable connection between the first connector ring 5 and the ring element 11.

Figure 3:
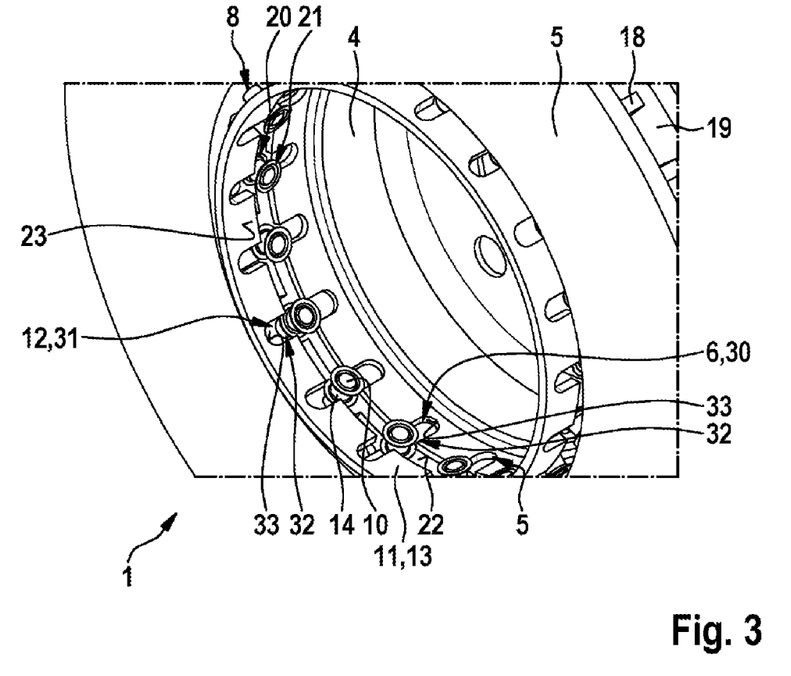
FIG. 3 shows the brake disk assembly of FIG. 1 according to one alternative embodiment.

FIG. 3 shows an alternative embodiment of the brake disk assembly 1 from FIG. 1. As opposed to the brake disk assembly 1 known from FIG. 1, the first radial openings 6 in the first connector ring 5 are presently configured as first peripheral openings 30 that in the axial direction are open toward the periphery, and the further radial openings 12 in the wall element 11, or the ring element 13, respectively, are configured as peripheral openings 31 that in the axial direction are open toward the periphery. A first peripheral opening 30 as well as a further peripheral opening 31 herein have in each case one axial receptacle 32 through which the tubular rivet 14, or alternatively only the fixing pin 10, can be introduced, and an axial detent 33 which delimits the maximum, in particular predefinable, insertion depth of the tubular rivet 14 into the respective peripheral opening 30, 31.

In each case one fixing pin 10 presently lies in each case in one radial opening 8 of the friction ring 3, said radial opening 8 being configured as a radial bore. In each case one fixing pin 10 herein is also guided without play through in each case one tubular rivet 14. For the assembly or the form-fitting connection of the friction ring 3, the brake disk chamber 4 and the ring element 13, the brake disk chamber 4 as well as the ring element 13 are push-fitted axially onto the tubular rivet 14. The brake disk chamber 4 herein is preferably push-fitted axially onto the friction ring 3, or the tubular rivet 14, respectively, from a first side, and the ring element 4 is push-fitted axially onto the friction ring 3, or the tubular rivet 14, respectively, from another side that is opposite the first side. This guarantees that the tubular rivet 14 is enclosed by the brake disk chamber 4 and the ring element 13. After the tubular rivet 14 has been push-fitted, the brake disk chamber 4 and the ring element 13 are preferably fastened in a form-fitting manner in particular by configuring the one collar 20 which bears on the external circumferential shell wall 22 of the first connector ring 5, and by configuring the other collar 21 which bears on the internal circumferential shell wall 23 of the ring element 13. Alternatively, the collars 20, 21 of the tubular rivet 14 are configured already prior to assembling the brake disk chamber 4 and the wall element 13 on the friction ring 3 or the tubular rivets 14. The ring element 13 when assembling is preferably press-fitted into the brake disk chamber 4.

The advantage of a simple assembly capability of the brake disk assembly 1 that is easy to carry out results on account of the configuration of the peripheral openings 30, 31. Moreover, the first and the further radial openings 6, 12, or peripheral openings 30, 31, are capable of being produced or configured in a simple manner, in particular by a punching process. Alternatively, the second radial opening 8 is also capable of being configured as a peripheral opening.

Figure 4:
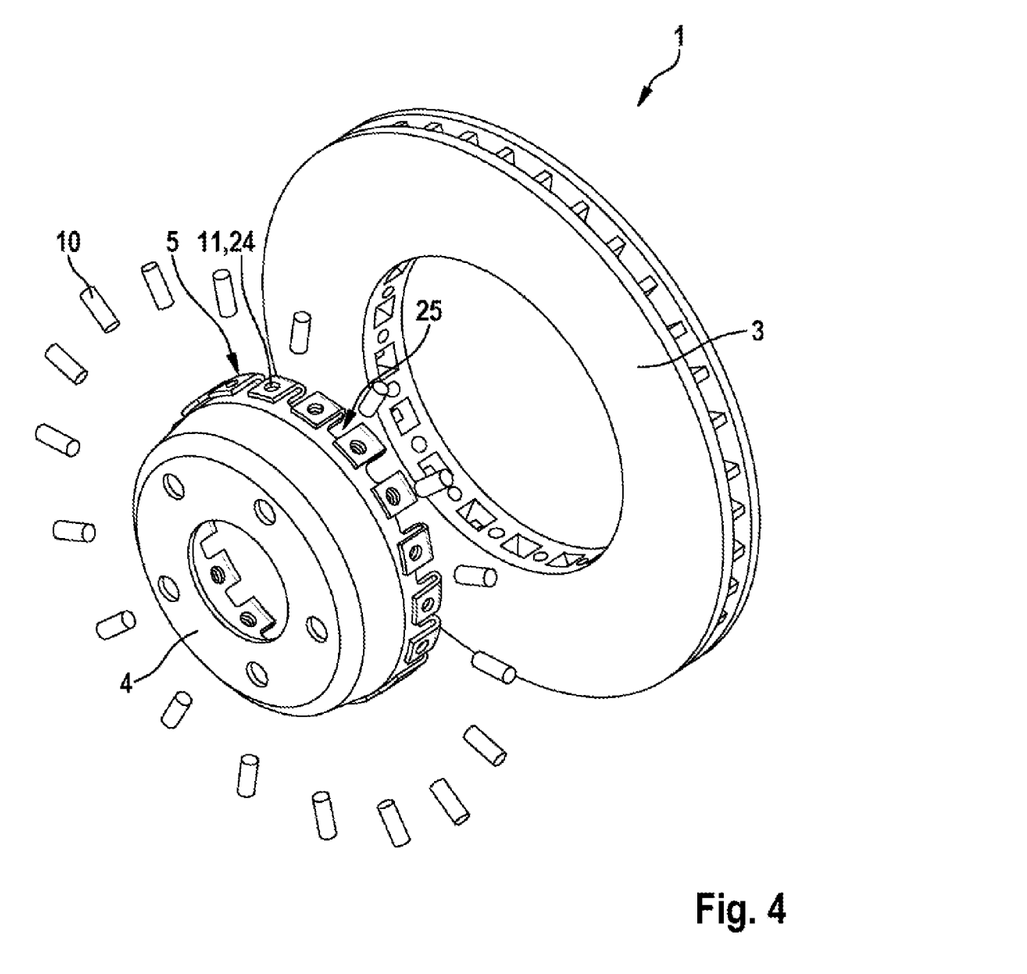
FIG. 4 shows the brake disk assembly according to one further exemplary embodiment in an exploded illustration.

FIG. 4 shows the brake disk assembly 1, wherein the wall element 11, as opposed to the exemplary embodiment from FIG. 1, now is configured so as to be integral to the first connector ring 5. The first connector ring 5 presently has a plurality of wall elements 11 which are distributed uniformly across the circumference of said connector ring 5, wherein the wall elements 11 are presently configured as bent-back wall tongues 24. It is in particular provided that at least one circumferential portion of the first connector ring 5 is bent in order for the wall tongues 24 to be configured. The wall tongues 24 are presently assigned to the first connector ring 5 on the external circumference. Alternatively, it is provided that the wall tongues 24 are assigned to the first connector ring 5 on the internal circumference. The first connector ring 5 presently has a plurality of wall tongues 24 which are disposed uniformly across the circumference. In each case one clearance 25 is presently configured between two neighboring wall tongues 24, said clearance 25 in a state in which the friction ring 3 and the brake disk chamber 4 are connected to one another in a form-fitting manner enabling a flow of air through the ventilation ducts 19.

Figure 5:
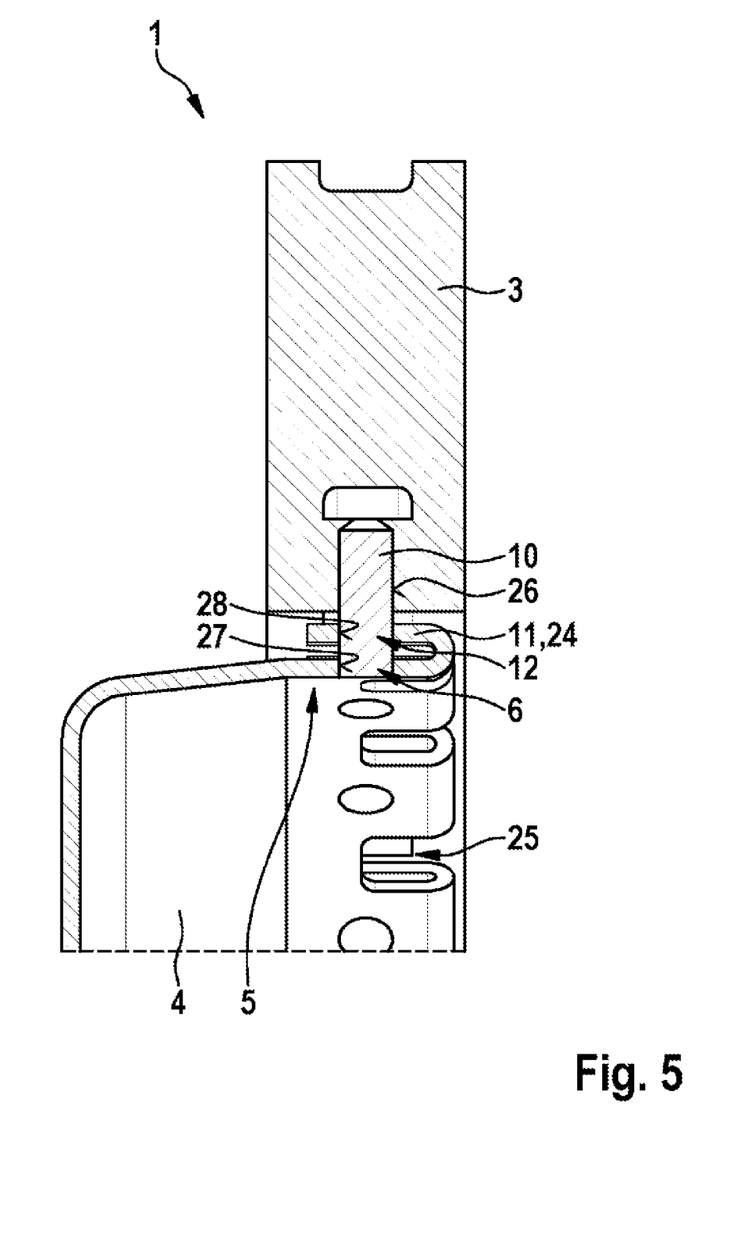
FIG. 5 shows the brake disk assembly of FIG. 4 in a cross-sectional illustration.

FIG. 5 shows the brake disk assembly 1 of FIG. 4, wherein the friction ring 3 and the brake disk chamber 4 are connected to one another in a form-fitting manner by the fixing pins 10. The fixing pin 10 is preferably press-fitted into the mutually aligned first radial opening 6, second radial opening 8, and the further radial opening 12. The press-fitting of the fixing pin 10 guarantees a particularly stable form-fitting connection between the friction ring 3 and the brake disk chamber 4. The fixing pin 10 presently protrudes into the second radial opening 6. It is preferably provided that the fixing pin 10 protrudes through the first radial opening 6.

It is preferably provided that the fixing pin 10 is first guided through the brake disk chamber 4, in particular the first radial opening 6 and the further radial opening 12, and is subsequently press-fitted into the second radial opening 8 or the radial bore of friction ring 3. The friction ring on each of the second radial openings 8 advantageously has in each case one equalization opening through which air can escape when press-fitting the fixing pin 10. Alternatively or additionally, at least one equalization taper, chamfer, groove, or through bore, which when press-fitting the fixing pin 10 into the respective second radial opening forms an equalization opening is provided on the respective fixing pin 10. A further processing step in which a disk thickness of the friction ring 3 and/or of the brake disk chamber 4 can be adapted is preferably performed after connecting the friction ring 3 and the brake disk chamber 4 by way of the fixing pin 10. Additionally or alternatively, a lateral run-out can be adapted.

The advantage of the brake disk assembly 1 lies in that the wall element 11 and/or the tubular rivet 14 implements a further or additional contact point for transmitting force between the fixing pin 10 and the brake disk chamber 4, such that an increase in terms of the torque that can be transmitted between the friction ring 3 and the brake disk chamber 4 is achieved. The overall contact face which is available for transmitting force herein is in each case the contact face between a shell wall 26, or an external shell wall, of the fixing pin 10 and an internal side 27, or an internal shell wall, of the first radial opening 6 of the first connector ring 5 and a further internal side 28, or an internal shell wall, of the further radial opening 12 of the wall element 11 configured as the ring element 13 or the wall tongue 24. The mechanical force or stress acting by the fixing pin 10 on the brake disk chamber 4 is reduced on account of the increased overall contact face.

For producing the brake disk chamber 4 and/or configuring the wall tongues 24 it is provided that the brake disk chamber 4 is first provided in the form of a preferably circular steel sheet. The steel sheet preferably has a thickness of 2.5 mm to 2.8 mm. The thickness of the steel sheet herein determines the thickness of the first wall element 11 to be subsequently configured, as well as the thickness of the first connector ring 5. A punching process in which radial strips or the wall tongues 24 are punched from the steel sheet is preferably performed thereafter. A forming process in which the steel sheet is formed to a brake disk chamber shape is performed thereafter. A further forming process or a folding step, in which the radial strips or wall tongues 24 are bent such that the wall elements 11 configured as bent-back wall tongues 24 are formed herein is subsequently performed. A boring step in which the first radial opening 6, in particular the first radial bore, in the first connector ring 5 and the further radial opening 12, in particular the further radial bore, are configured in a mutually aligned manner in the wall element 11 is thereafter performed. It is optionally provided that a further process step which widens the radial openings 8, 12, in particular the diameters thereof, in such a manner that said radial openings 8, 12 correspond in each case to an external diameter of the fixing pin 10 is carried out.

In the case of the wall element 11 being configured as a ring element 13 and being press-fitted into the first connector ring 5, it is preferably provided that the first radial opening 6 and the further radial opening 12 after the press-fitting are configured by means of a bore. Alternatively, prior to the ring element 13 being press-fitted into the first connector ring 5, the first radial openings 6 and the further radial openings 12 are configured by means of a punching process as first peripheral openings 30 and further peripheral openings 31.

According to one alternative embodiment it is provided that the wall element 11 configured so as to be integral to the connector ring 5 is configured as a flange 29. An end side of the flange 29 herein is preferably formed by the external circumferential shell wall 22 of the brake disk chamber 4, and a tubular portion of the flange 29 is preferably formed by an internal shell wall 27 of the first radial opening 6 that in terms of length is extended in the radial direction. When the wall element 11 is configured as the flange 29, the further radial opening 12 preferably corresponds to the first radial opening 6.

The invention claimed is:
1. A brake disk assembly for a disk brake of a motor vehicle, comprising:

a friction ring formed of a first material, the friction ring having a second connector ring defining a plurality of second radial openings;

a brake disk chamber formed of a second material, the brake disk chamber having a first connector ring at a first end side at which the brake disk chamber is fastened to the friction ring, the first connector ring defining a plurality of first radial openings, the first and second connector rings being disposed so as to be mutually coaxial in such a manner that at least some of the plurality of first radial openings and some of the plurality of second radial openings are mutually aligned; and fixing pins configured for form-fitting mutual connection of the first and second connector rings arranged in at least some of the mutually aligned radial openings, wherein the first connector ring has at least one wall element which defines at least one further radial opening and is assigned to a circumference of the first connector ring in such a manner that the a respective one of the at least one further radial opening is aligned with one of the first radial openings, and wherein a respective one of the fixing pins is also arranged in the respective one of the at least one further radial opening.

2. The brake disk assembly as claimed in claim 1, wherein the plurality of first radial openings, the plurality of second radial openings, and/or the at least one further radial opening are configured as radial bores.

3. The brake disk assembly as claimed in claim 1, wherein the plurality of first radial openings, the plurality of second radial openings, and/or the at least one further radial opening are configured as axial peripheral openings that are open toward an axial periphery of the first connector ring, the second connector ring, and/or the at least one wall element, respectively.

4. The brake disk assembly as claimed in claim 1, wherein the at least one wall element is assigned to an internal circumference or an external circumference of the first connector ring.

5. The brake disk assembly as claimed in claim 1, wherein the at least one wall element is a separate ring element disposed coaxially with the first connector ring.

6. The brake disk assembly as claimed in claim 5, wherein the at least one ring element is press-fitted into or onto the first connector ring.

7. The brake disk assembly as claimed in claim 1, wherein the first connector ring and the at least one wall element are connected to one another by at least one tubular rivet which penetrates one of the plurality of first radial openings and one of the at least one further radial openings.

8. The brake disk assembly as claimed in claim 1, wherein the at least one wall element is integral with the first connector ring.

9. The brake disk assembly as claimed in claim 1, wherein the at least one wall element is configured as a bent-back wall tongue.

10. The brake disk assembly as claimed in claim 1, wherein the first connector ring has a plurality of wall tongues disposed uniformly across the circumference.

11. The brake disk assembly as claimed in claim 1, the respective one of the fixing pin pins is press-fitted into at least one radial opening of the mutually aligned first, second and further radial openings.

12. A method for producing a brake disk assembly for a disk brake of a motor vehicle, comprising:

fastening a brake disk chamber, which is formed of a second material, to a friction ring, which is formed from a first material, at an end side of the brake disk chamber at which a first connector ring, which has a plurality of first radial openings, is arranged such that the first connector ring and a second connector ring of the friction ring, which has a plurality of second radial openings, are disposed so as to be mutually coaxial in such a manner that at least some of the first radial openings and some of the second radial openings are mutually aligned, and placing a fixing pin into at least some of the mutually aligned first and second radial openings so as to provide a form-fitting mutual connection of the first and second connector rings, wherein the first connector ring includes at least one wall element, which has at least one further radial opening and is assigned to a circumference of the first connector ring in such a manner that a respective one of the at least one further radial opening is aligned with one of the first radial openings, and wherein the placing of the fixing pin includes placing the fixing pin into the respective one of the at least one further radial opening.

\* \* \* \* \*